United States Patent [19]

Doninger

[11] Patent Number: 4,915,329

[45] Date of Patent: Apr. 10, 1990

[54] HAMPER FRAME

[76] Inventor: Michael B. Doninger, 1815 Yale Rd., Merrick, N.Y. 11566

[21] Appl. No.: 323,434

[22] Filed: Mar. 14, 1989

[51] Int. Cl.4 .............................................. B65B 67/12
[52] U.S. Cl. ...................................... 248/98; 248/129; 280/47.34
[58] Field of Search ....................... 248/98, 97, 99, 95, 248/96, 153, 129; 280/47.34, 651

[56] References Cited

U.S. PATENT DOCUMENTS

| | | | |
|---|---|---|---|
| 2,726,095 | 12/1955 | Emery | 280/79.2 |
| 3,756,548 | 9/1973 | Santarelli et al. | 248/99 X |
| 3,806,146 | 4/1974 | Shaw | 248/98 X |
| 4,017,092 | 4/1977 | Boomer | 248/98 X |
| 4,684,087 | 8/1987 | Spickard | 243/97 |
| 4,692,050 | 9/1987 | Kaufmann | 248/974 |

FOREIGN PATENT DOCUMENTS 3545709  6/1987  Fed. Rep. of Germany ...... 280/651

Primary Examiner—Alvin C. Chin-Shue
Attorney, Agent, or Firm—David P. Gordon

[57] ABSTRACT

The caster wheel, mounted hamper of the present invention is adapted to be used with detachable canvas liners and the like, for example for use in postal service. The invention includes detachable ring and side support sections which, when assembled, are firmly and securely mounted on a wheeled assembly to provide a stable hamper frame for detachable engagement with a canvas liner or the like. Assembly and disassembly can be accomplished quickly and easily and the disassembled unit can be conveniently stored, shipped and/or repaired.

15 Claims, 4 Drawing Sheets

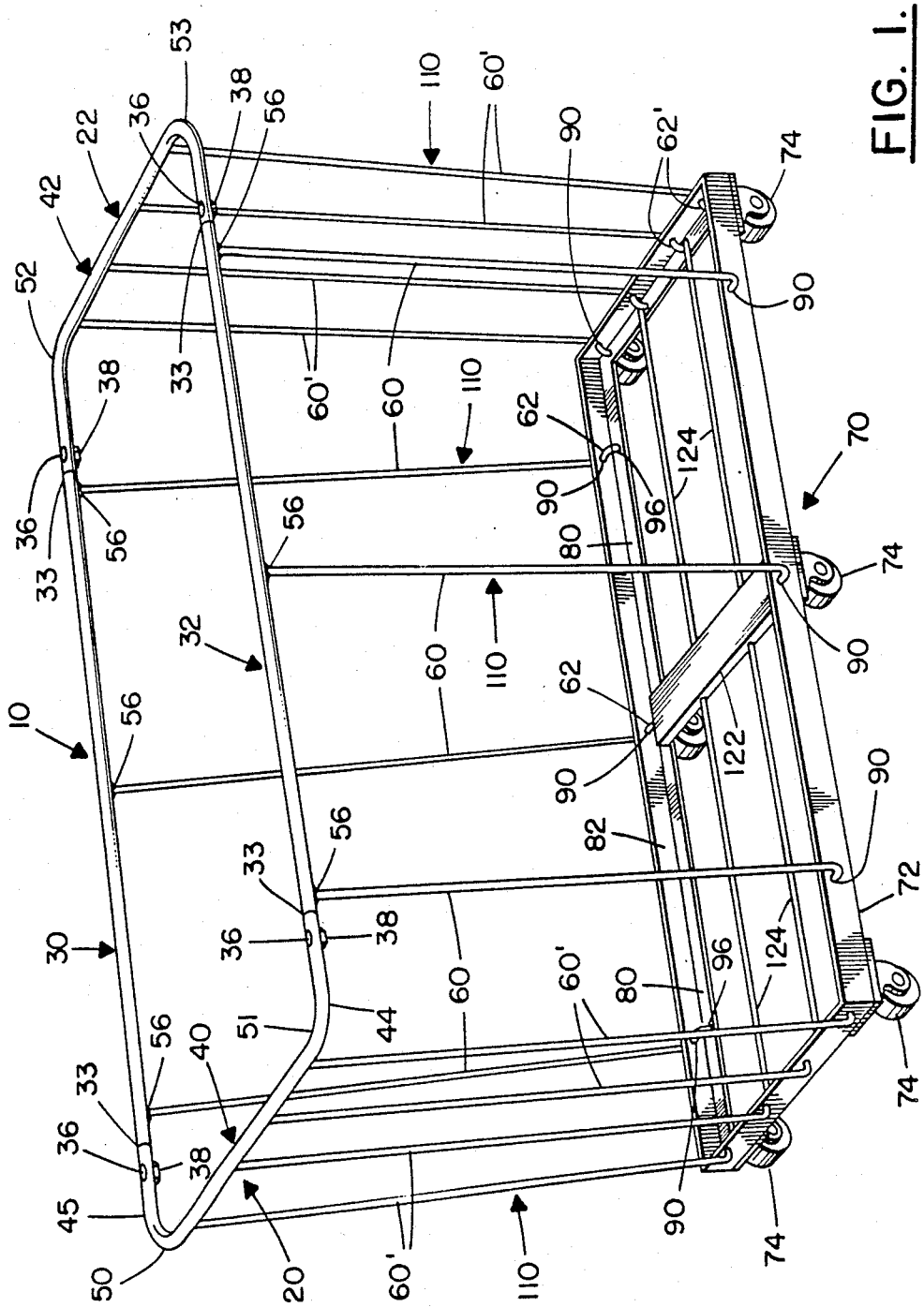

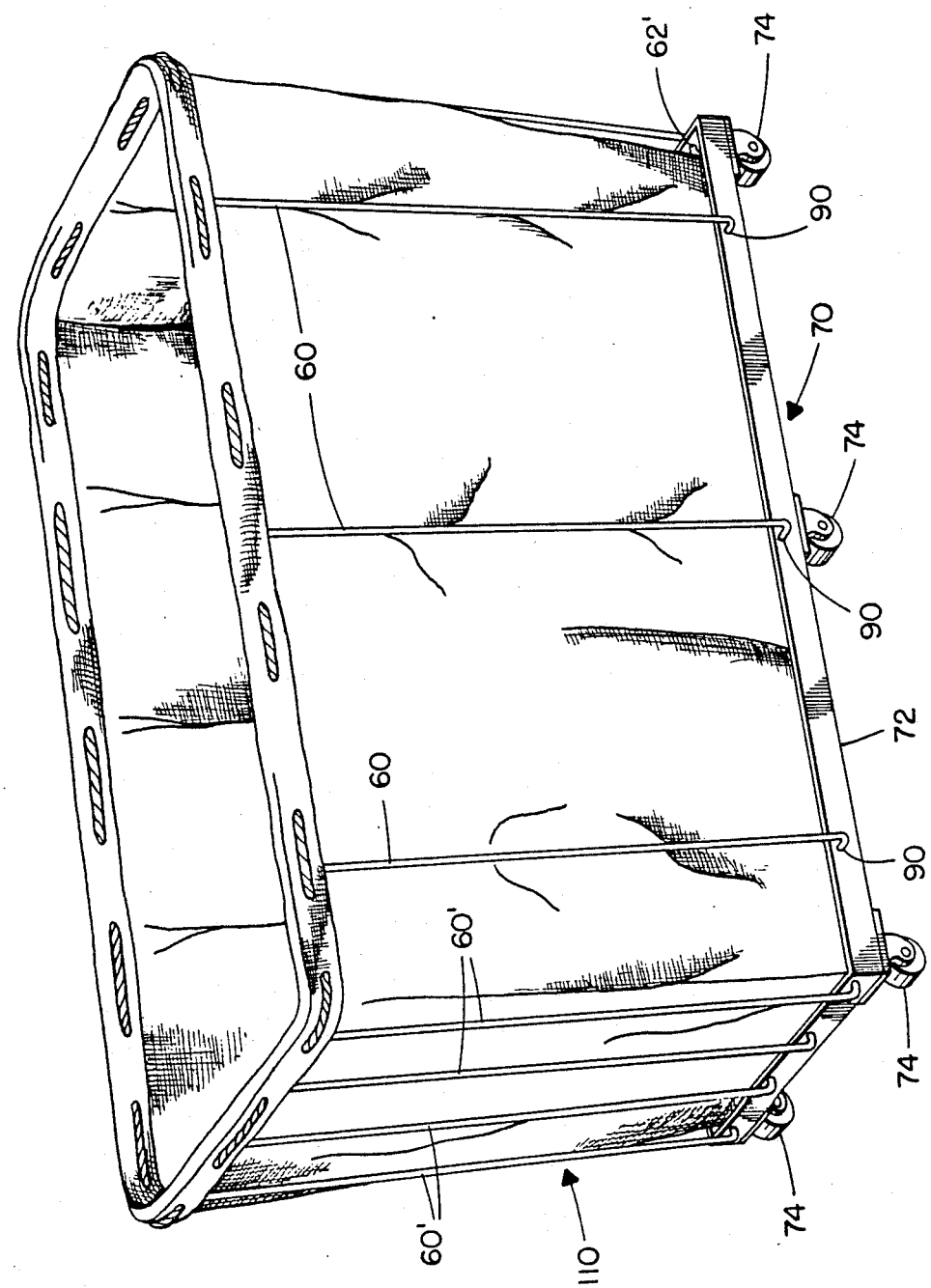

HAMPER FRAME

BACKGROUND

The present invention is broadly directed to wheeled hampers primarily for use in handling postal material, packages and the like. More particularly, the present invention is directed to a corrosion resistant hamper frame which is designed to reduce the occurrence of failure due to wear and tear of the hamper and the detachable liner with which it is used, and which is easily repairable, assembleable, and disassembleable when used in combination with a specially designed wheeled assembly.

Wheeled hampers are widely used in postal and commercial applications and commonly include a wheeled base to which a unitary metal hamper frame is bolted and riveted or otherwise permanently attached. Frequently, these prior art frames are configured in a way which increases the likelihood of hamper frame failure in the course of normal wear and tear. Additionally, the manner in which these frames are attached to a wheeled base makes routine assembly and disassembly impractical and repairs difficult if not impossible. Moreover, it is impractical to apply a corrosion resistant coating to these frames on account of the way in which they are configured.

SUMMARY OF THE INVENTION

It is therefore an object of the present invention to provide a hamper frame for use in combination with a wheeled base assembly which can be readily assembled and disassembled to facilitate shipment, storage and replacement of parts.

It is an additional object of the present invention to provide a hamper frame supported on caster wheels.

It is a further object of the present invention to provide a hamper frame which has a minimized propensity to mechanical failure.

It is yet a further object of the present invention to provide a hamper frame which is configured to avoid damage to the liner material with which it is in contact and to minimize the likelihood of injury to handling personnel.

It is another object of the present invention to provide a corrosion resistant hamper frame.

In accord with the objects of the invention, a hamper adapted to support a liner formed of canvas or like material in combination with an assembly to which caster wheels are mounted is provided; this combination comprises a generally rectangular tubular hamper frame formed of two separable end members and two separable side members, each of the side members being substantially straight and each of the end members having substantially straight mid-portions and substantially parallel, opposed end portions extending in the same general direction. Each mid-portion is joined to its opposed end portions by a pair of arcuate, i.e. curved segments, and each of the end portions is detachably engaged with the side members to form a generally rectangular ring.

A plurality of spaced apart resilient rods are provided which are fixedly attached to the underside of the ring at spaced apart locations along both the end members and side members and the resilient rods respectively terminate in step-shaped configurations which extend toward the interior of the ring and have base portions for supporting the resilient rods. The combination further includes a caster wheel assembly which has a generally rectangular peripheral member on which are provided a plurality of ledge portions with apertures to supportably contact the base portions of the resilient rods. Also provided on the peripheral member are side portions substantially transverse to said ledge portions, the side portions having apertures to receive the step-shaped configurations of the resilient rods.

In use, as hereinafter more particularly described, the separate end members and side members are joined together and fixed in position and the step-shaped elements of the resilient rods are inserted through apertures of the peripheral member of the base assembly so that they remain in place, supported by the ledge and side portions of the peripheral members.

A canvas liner, or similar material liner is detachably affixed to the hamper ring and the device of the present invention is ready for use.

BRIEF DESCRIPTION OF THE DRAWINGS

FIG. 1 is a perspective view of the hamper and wheeled base assembly combination of the present invention;

DETAILED DESCRIPTION OF THE PREFERRED EMBODIMENTS

Figure 1A:
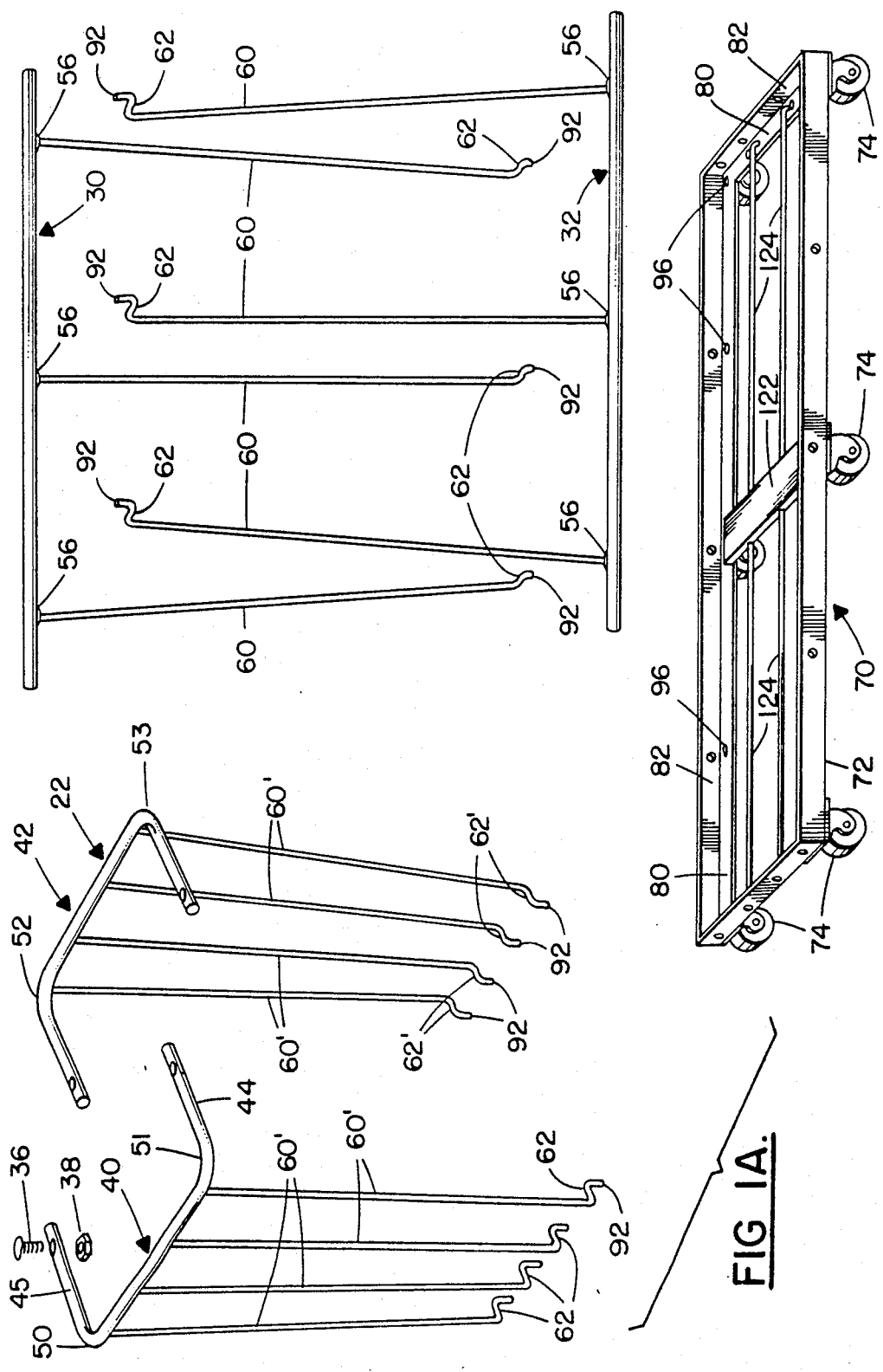
FIG. 1(a) shows the combination of FIG. 1 in a disassembled state.
Figure 2:
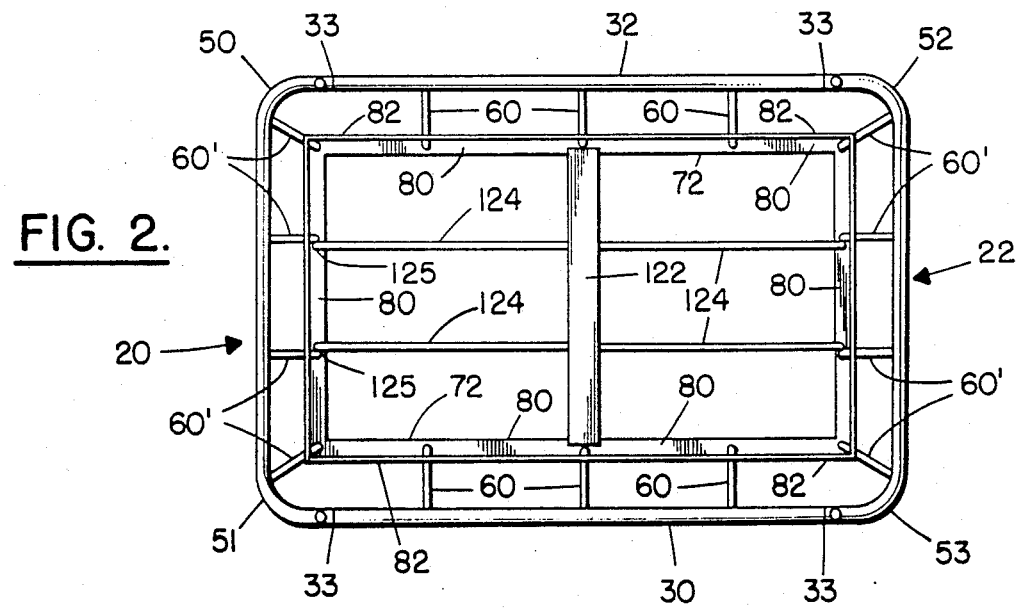
FIG. 2 is a top plan view of the combination of FIG. 1.
Figure 3:
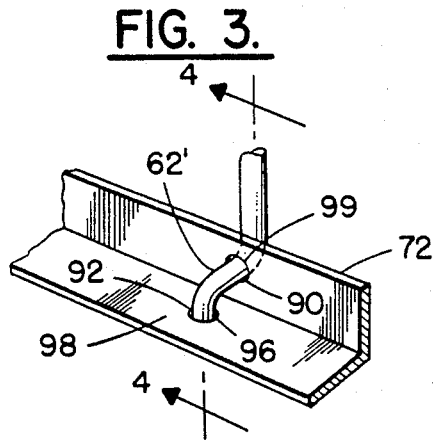
FIG. 3 is a partial perspective view showing the engagement of the hamper with the truck assembly.
Figure 4:
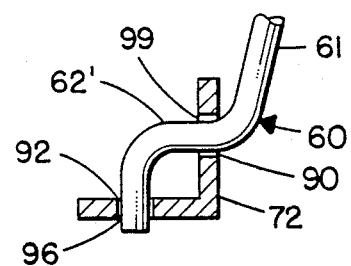
FIG. 4 is a sectional elevation view of the engagement arrangement of FIG. 3.
Figure 5:
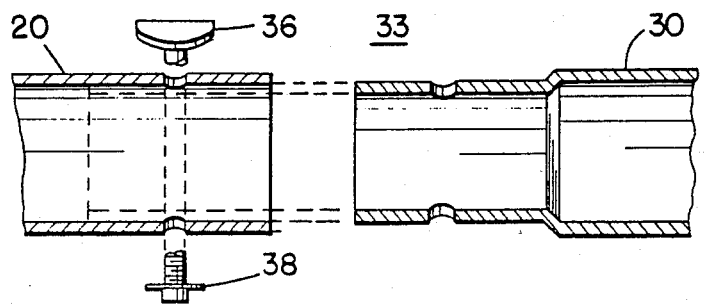
FIG. 5 shows a sectional elevation view of the engagement of side and end members of the hamper of FIG. 1; and, FIG. 6 shows the hamper and wheeled base assembly of FIG. 1 detachably engaging and supporting the canvas liner.

A hamper in combination with a wheeled assembly in accordance with the present invention is shown in FIG. 1. This combination is made entirely of steel, (except for caster wheels) and is in large part formed of tubular steel so that it is both light-weight and strong. Also, the combination is easily disassembled and reassembled as hereinafter described. The disassembled combination is shown in FIG. 1(a). With reference to FIGS. 1 and 1(a), a generally rectangular shaped, tubular metal frame is shown at 10 comprised of end members 20, 22 and side members 30, 32. The end members 20, 22, 30, 32 are joined to the side members in a telescoping, slide-fit as shown representatively at 33 in FIG. 5; the slidably engaged metal tubes are suitably clamped together by means of saddle screw 36 and nut 38. As can be seen from FIGS. 1 and 1(a), the side members 30, 32 are substantially straight, as are the mid-portions 40, 42 of the end members 20, 22. The parallel terminal end portions 44, 45 and 46, 48 of end members 20, 22 are joined to their respective mid-portions by arcuate, i.e. curved segments 50, - - - 53. Each of the side members 30, 32 has downwardly depending, spaced apart resilient rods 60 which are affixed to the underside of the tubular side members 30, 32, e.g. by welding or brazing, as indicated at 56. If desired, the underside may include holes (not shown) into which the resilient rods fit. The rods 60, at their lower end, each have a step-shaped configuration 62 shown in more detail in FIGS. 3 and 3(a), which extend inwardly toward the interior of the tubular frame 10. In a similar manner, each of the straight mid-portions 40, 42 of end members 20, 22 has affixed thereto downwardly depending spaced apart resilient rods 60' with step-shaped configurations 62' which extend inwardly toward the interior of the frame 10. The aforedescribed frame 10 with depending side bars 60, 60' is mounted on a wheeled assembly 70 which includes a rigid, L-shaped peripheral member 72 mounted on conventional swivel-wheel caster assemblies 74. The peripheral member 72 has an integral floor portion 80 and an integral side wall 82 with the side wall having apertures 90 arranged to correspond to the respective step-portions 62 of resilient rods 60, 60'. As indicated in more detail in FIGS. 3 and 4, the step-shaped configuration 62 of each rod 60, 60' is inserted in an aperture 90, by first inserting the base 92 of a rod 60, 60' to rest step portions 62 supportively on a an edge of aperture 90 of peripheral member 72. This can be accomplished by engaging the rod 60 in close-fitting aperture 96 as indicated in FIG. 4. All of the rods 60, 60' are engaged with wheeled assembly 70 with their step configurations 62 at a common level and resting on peripheral member 72. The result is that the hamper comprised of end members 20, 22, side members 30, 32 and rods 60, 61 is stably mounted on the assembly 70 as shown in FIGS. 3 and 4. This occurs for each of the rods 60, 60' and consequently the hamper is firmly maintained in position at all times. Wheeled assembly 70 is provided with a transverse reinforcing channel 122 affixed, e.g. by welding to the floor 80 of peripheral member 72 and longitudinal stiffener bars 124 are similarly affixed to the side wall 82 and channel member 122. The location of stiffener bars 124 to abut the bases of adjacent rods 60 as indicated at 125, provides an additional measure of stability to the hamper.

A preferred feature of the present invention is that the lateral, vertical resilient rods 60, 60' are located only along the straight portions of the frame 10, and none of the rods are located at the corner locations 73. This is to avoid the development of fracture-inducing stress points at the locations which will experience the most severe mechanical shock during ordinary use. Also, the resilient side rods 60, 60' are welded to frame 10 at the underside of the frame so that sharp edges are not exposed to handling personnel.

Figure 3A:
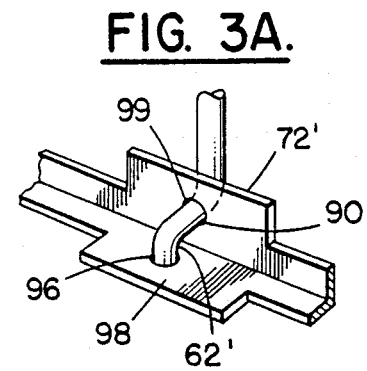
FIG. 3(a) is a modification of the arrangement of FIG. 3.

A further feature of the present invention, shown in FIG. 3(a) is that floor 80 and side wall 82 of peripheral member 72 need not be uniformly continuous; it being sufficient if discrete ledges and side wall segments are located corresponding to the bases of rods 60, 60'.

With reference to FIG. 6, a conventional canvas liner 200, suitable for holding mail, packages and the like is shown detachably connected to hamper frame 10. When it is required that the hamper frame be shipped, or stored, it is only necessary to release the ties on the canvas liner, release the saddle screw arrangements 36, 38, separate the end members 20, 22 from the side members 30, 32 and lift the rods 60, 60' out of engagement with truck assembly 70. As noted hereinabove, FIG. 1(a) illustrates the disassembled hamper ready for storage, shipment, repair or reassembly. Reassembly is very easy as described hereinabove.

There has been described and illustrated herein, a hamper in combination with a wheeled assembly in accordance with the present invention. While particular embodiments of the invention have been described, it is not intended that the invention be limited exactly thereto, as it is intended that the invention be as broad in scope as the art will permit. Thus those skilled in the art will recognize that while steel construction is disclosed and preferred, other relatively light strong alloys may be used for particular purposes. Also, while the side rods are shown mostly evenly spaced, various spacing can be used for special purposes. Also, the hamper of the present invention can be readily made in a multiplicity of sizes ranging from small sizes suited for office use to large sizes useful in commercial and industrial facilities.

Therefore it will be apparent to those skilled in the art that other changes and modifications may be made to the invention as described in the specification without departing from the spirit and scope of the invention.

What is claimed is:

1. A hamper frame adapted to support a liner formed of canvas or like material in combination with a base adapted to be mounted on caster wheels, said combination comprising:
   (a) a generally rectangular shaped, tubular frame formed of two separable end members and two separable side members, each of said side members being substantially straight and each of said end members having substantially straight mid-portions and transverse, substantially parallel, opposed, end portions extending in the same general direction, each said mid-portion being joined to its opposed end portions by a pair of arcuate segments, and each of said end portions being detachably engaged with the side members to form a generally rectangular shaped ring;
   (b) a plurality of spaced apart resilient rods attached to the underside of said ring at spaced apart locations along the end members and along the side members, said resilient rods respectively terminating in base portions having step-shaped configurations which extend toward the interior of said ring; and
   (c) a base assembly which includes a generally rectangular peripheral member having
      (i) a plurality of horizontal ledge portions engaging ends of the base portions of said rods
      (ii) side portions substantially transverse to said ledge portions having apertures receiving and supporting horizontal portions of the stepshaped base configurations of the resilient rods.

2. A combination in accordance with claim 1 wherein the end members and side members of the hamper are formed of tubular metal and are dimensioned so that the end members are engageable with the side members in a telescoping sliding fit with clamping means being provided for directly holding together said end members and side members.

3. A combination in accordance with claim 1 wherein said end members and said side members are formed of tubular metal and said resilient rods are metal rods welded or brazed to said end members and said side members only at locations on the substantially straight portions of said end members and side members.

4. A combination in accordance with claim 1 wherein the peripheral member of said base assembly is in the form of a channel having said ledge and substantially transverse side portions, said substantially transverse side portions being substantially vertical, and said ledge portions further including second apertures each for receiving an end of the base portion of a rod.

5. A combination in accordance with claim 1 wherein the step-shaped configuration of each of the rods includes a substantially horizontal section each of which is respectively surroundingly and supportively engaged by an aperture of the peripheral member of the base assembly in partial contact therewith at an edge of such aperture.

6. A combination in accordance with claim 1 wherein a liner of canvas or comparable material is detachably engaged to the rectangular shaped tubular hamper frame.

7. A combination in accordance with claim 1 which further comprises:
 (d) wherein said base assembly is mounted on caster wheels.

8. A combination in accordance with claim 2, wherein said resilient rods are substantially vertical relative to said ring and comprise metal rods welded or brazed to said end members and said side members only at locations on the substantially straight portions of said end members and said side members.

9. A combination in accordance with claim 8, wherein the peripheral member of said base assembly is in the form of a channel having said ledge and substantially transverse side portions, said substantially transverse side portions being substantially vertical, and said ledge portions further including second apertures each for receiving an end of the base portion of a rod.

10. A combination in accordance with claim 9, wherein the step-shaped configuration of each of the rods includes a substantially horizontal section each of which is respectively surroundingly and supportively engaged by said aperture of the peripheral member of the base assembly in partial contact therewith at an edge of said aperture.

11. A combination in accordance with claim 10, wherein a liner of canvas or comparable material is detachably engaged to the rectangular shaped tubular hamper frame.

12. A combination in accordance with claim 8, which further comprises:
 (d) caster wheels, wherein said base assembly is mounted on said caster wheels.

13. A combination in accordance with claim 9, which further comprises:
 (d) caster wheels, wherein said base assembly is mounted on said caster wheels.

14. A combination in accordance with claim 10, which further comprises:
 (d) caster wheels, wherein said base assembly is mounted on said caster wheels.

15. A combination in accordance with claim 11, which further comprises:
 (d) caster wheels, wherein said base assembly is mounted on said caster wheels.

* * * * *